United States Patent
Chen (10) Patent No.: US 8,529,307 B1
(45) Date of Patent: Sep. 10, 2013

(54) DETECTION CIRCUIT AND MANUFACTURING METHOD FOR LCD PANEL

(75) Inventor: Cheng-hung Chen, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/641,108

(22) PCT Filed: Aug. 9, 2012

(86) PCT No.: PCT/CN2012/079867
§ 371 (c)(1),
(2), (4) Date: Oct. 13, 2012

(30) Foreign Application Priority Data

Aug. 1, 2012 (CN) .......................... 2012 1 0271456

(51) Int. Cl.
*H01J 9/42* (2006.01)
*G02F 1/13* (2006.01)
*G01R 31/00* (2006.01)
*G09G 3/36* (2006.01)

(52) U.S. Cl.
USPC .. 445/3; 324/750.3; 324/760.01; 324/760.02; 349/192; 349/54

(58) Field of Classification Search
USPC .................... 445/3; 349/192, 54; 324/750.3, 324/760.01, 760.02
See application file for complete search history.

(56) References Cited

U.S. PATENT DOCUMENTS

| | | | |
|---|---|---|---|
| 7,995,011 B2 * | 8/2011 | Jeong et al. | 324/760.01 |
| 8,294,470 B2 * | 10/2012 | Kim | 324/760.02 |
| 2007/0001711 A1 * | 1/2007 | Kwak | 324/770 |
| 2009/0295424 A1 * | 12/2009 | Guo et al. | 324/770 |

FOREIGN PATENT DOCUMENTS

| | | | | |
|---|---|---|---|---|
| JP | 08110526 | A | * | 4/1996 |
| JP | 11084353 | A | * | 3/1999 |
| JP | 2002277896 | A | * | 9/2002 |
| JP | 2010286617 | A | * | 12/2010 |
| KR | 2008000157 | A | * | 1/2008 |

* cited by examiner

*Primary Examiner* — Mariceli Santiago
(74) *Attorney, Agent, or Firm* — Andrew C. Cheng (57) ABSTRACT

The present invention discloses a detection circuit in the assembly process of an LCD panel. Through the testing pad collection and the switch collection, the signal line of each of the panel units connects to the corresponding testing signal pad of the testing pad collection respectively through the input terminal and the output terminal of the control switch of the switch collection, and the control terminal of the control switch electrically connects to the control signal pad in order to selectively apply an individual testing to one of the panel units. The present invention also provides a manufacturing method for an LCD panel. Accordingly, the present invention can simplify the detection circuit and reduce the load of the detection circuit.

10 Claims, 4 Drawing Sheets

DETECTION CIRCUIT AND MANUFACTURING METHOD FOR LCD PANEL

BACKGROUND OF THE INVENTION

1. Field of the Invention

The present invention relates to the field of liquid crystal display (LCD) technology, and more particularly to a detection circuit and a manufacturing method for an LCD panel.

2. Description of Related Art

The liquid crystal display manufacturing process is generally divided into an array process, an assembly process, and a module process. The array process is for manufacturing a glass substrate made of glass substrate and required for LCD device such that it combines a color filter substrate, and attachment after injecting liquid crystal between the two substrates in order to form a large combined glass. Then, the large combined glass is cut to form multiple LCD panels. In the module process, assembling the LCD panel formed after being cut with a hack frame and multiple parts to form an LCD device.

In assembly process, after forming the large combined glass and before cutting the large combined glass, it requires to test the large combined glass to ensure the following process operating smoothly. Wherein, the large combined glass has multiple panel units, it requires to apply an array testing or a PSVA (Polymer Stabilization Vertical Alignment) testing for the panel units to ensure that each of the panel units work normally.

Figure 1:
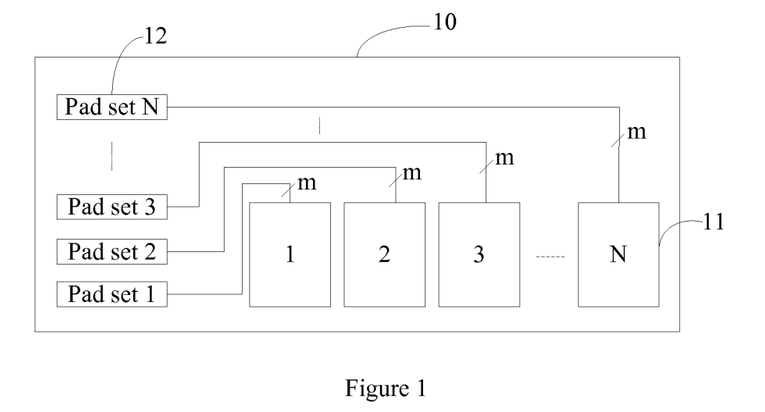
FIG. 1 is a schematic layout of the detection circuit of the multiple panel units in prior art.

As shown in FIG. 1, the large combined glass 10 has N panel units 11, each of the panel units requires m test lines or in PSVA lines so that the entire combined glass 10 requires N×m test lines or N×m PSVA lines, and each of the test lines or the PSVA lines corresponds to a pad (test pad, not shown) so that the large combined glass 10 requires at least N×m pads in order to apply test signals to the test lines or the PSVA lines through the pads.

In FIG. 1, each of the panel units 11 corresponds to a pad set wherein each of the pad sets 12 has m testing signal pads, and is respectively connected to the in test lines or the PSVA lines of each of the panel units. Such detection circuit can respectively detect the multiple panel units. However, when the large combined glass 10 has more panel units 11 (i.e., the larger number of N) or the utilization rate of the large combined glass 10 is higher, the number oldie test lines or testing, signal pads will increase, it will be difficult to dispose so many test lines and testing signal pads on the large combined glass 10 at this time.

Figure 2:
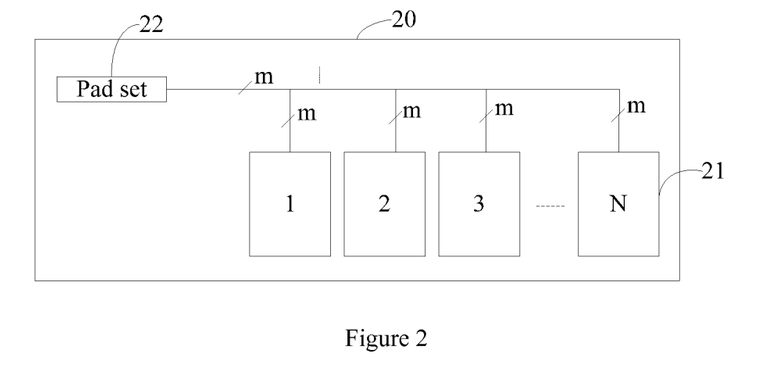
FIG. 2 is a schematic layout of the detection circuit of the simplified combined glass proposed by the inventor of the present invention.

With reference to FIG. 2, in order to reduce the number of the test lines or the testing signal pads on the large combined glass 20, the inventor of the present invention has proposed a solution. The solution is connecting the same test lines or the PSVA lines of the different panel units 21 in parallel to a same circuit line. Each of the same circuit lines connects to one pad, wherein pad set 22 includes m pads. Therefore, the testing lines or PSVA lines of the large combined glass 20 can be reduced from N×m lines to in lines, and the number of the pads can be reduced from N×m to m.

SUMMARY OF THE INVENTION

The main technical problem solved by the present invention is to provide a detection circuit and a manufacturing method for an LCD panel for simplifying the detection circuit around multiple panel units the load of the detection circuit, and clearly distinguishing the panel units having short circuit at the same time.

To solve the above technical problem, a technical solution provided by the present invention is: to provide a detection circuit in the assembly process of an LCD panel for applying a testing, to multiple panel units of a combined substrate, wherein the multiple panel units are divided into at least two panel unit groups, and each of the panel unit groups comprises at least one of the panel units, and the multiple panel units comprise at least a signal line group, and each of the signal line groups comprises a signal line, and the detection circuit comprises:

at least a test line group disposed on the combined substrate, and each of the test line groups comprises a test line;

multiple control line groups disposed on the combined substrate, and each of the control line groups comprises a control line;

a testing pad collection disposed on the combined substrate, and the testing pad collection comprises multiple control signal pad groups and at least a testing signal pad group, wherein each of the control signal pad groups comprises a control signal pad, and each of the testing signal pad groups comprises a testing signal pad; and a switch collection disposed on the combined substrate, and the switch collection comprises at least two control switch groups, and each of the control switch groups comprises at least a control switch, and the control switch comprises a control terminal, an input terminal, and an output terminal, wherein the control terminal of each of the control switches electrically connects to the corresponding, control signal pad through the corresponding control line, and the input terminal of each or the control switches electrically connects to the corresponding testing signal pad through the corresponding test line, and the output terminal of each of the control switches electrically connects to the signal line of the corresponding panel unit; wherein, one of the test lines respectively connects to at least two of the panel units through at least two of the corresponding control switches; the number of the control signal pad groups, the number of the control line groups, and the number of the panel unit groups are consistent and are corresponding one-by-one; each of the control switches is a thin film transistor comprising a gate electrode, a source electrode, and a drain electrode, and the gate electrode electrically connects to the corresponding control signal pad through the corresponding control line, and the source electrode electrically connects to the corresponding testing signal pad through the corresponding, test line, and the drain electrode electrically connects to the corresponding signal line.

Wherein, the control terminal of the control switch corresponding to each of the panel unit groups electrically connects to the corresponding one of the control signal pads through the corresponding one of the control lines; the number of the test lines and the number of the testing signal pads are consistent and are corresponding one-by-one, and the input terminals of the control switches corresponding, to the same signal lines of the panel units all electrically connect to one of the testing signal pads through one of the test lines.

To solve the above technical problem, another technical solution provided by the present invention is: to provide a detection circuit in the assembly process of an LCD panel for applying a testing to multiple panel units of a combined substrate, wherein the multiple panel units are divided into at least two panel unit groups, and each of the panel unit groups comprises at least one of the panel units, and the multiple panel units comprise at least a signal line group, and each of the signal line groups comprises a signal line, and the detection circuit comprises:

at least a test line group disposed on the combined substrate, and each of the test line groups comprises a test line;

multiple control line groups disposed on the combined substrate, and each of control line groups comprises a control line;

a testing pad collection disposed on the combined substrate, and the testing pad collection comprises multiple control signal pad groups and at least a testing signal pad group, wherein each of the control signal pad groups comprises a control signal pad, and each of the testing signal pad groups comprises a testing signal pad; and a switch collection disposed on the combined substrate, and the switch collection comprises at least two control switch groups, and each of the control switch groups comprises at least a control switch, and the control switch comprises a control terminal, an input terminal, and an output terminal, wherein, the control terminal of each of the control switches electrically connects to the corresponding control signal pad through the corresponding control line, and the input terminal of each of the control switches electrically connects to the corresponding testing signal pad through the corresponding test line, and the output terminal of each of the control switches electrically connects to the signal line of the corresponding, panel unit, wherein, one of the test lines respectively connects to at least two of the panel units through at least two of the corresponding control switches.

Wherein, the number of the control signal pad groups, the number of the control line groups, and the number of the panel unit groups are consistent and are corresponding one-by-one.

Wherein, the control terminal of the control switch corresponding to each of the panel unit groups electrically connects to the corresponding one of the control signal pads through the corresponding one of the control lines; the number of the test lines and the number of the testing signal pads are consistent and are corresponding one-by-one, and the input terminals of control switches corresponding to the same signal lines of the panel units all connect to one of the testing signal pads through one of the test lines.

Wherein, each of the control switches is a thin film transistor comprising a gate electrode, a source electrode, and a drain electrode, and the gate electrode electrically connects to the corresponding control signal pad through the corresponding control line, and the source electrode electrically connects to the corresponding testing signal pad through the corresponding test line, and the drain electrode electrically connects to the corresponding signal line.

To solve the above technical problem, another technical solution provided by the present invention is: to provide a manufacturing method for an LCD panel comprising:

preparing a first substrate and a second substrate, wherein the first substrate corresponds to multiple panel units, and the multiple panel units are divided into at least two panel unit groups, and each of the panel unit groups comprises at least one of the panel units, and the multiple panel units comprise at least a signal line group, and each of the signal line groups comprises a signal line, and forming a detection circuit on the first substrate or the second substrate, and the detection circuit comprises:

at least a test line group, and each of the test line groups comprises a test line;

multiple control line groups, and each of the control line groups comprises a control line;

a testing pad collection comprising multiple control signal pad groups and at least a testing signal pad group, wherein each of the control signal pad groups comprises a control signal pad, and each of the testing signal pad groups comprises a testing, signal pad; and a switch collection comprising at least two control switch groups, and each of control switch groups comprises at least a control switch, and the control switch comprises a control terminal, an input terminal, and an output terminal, wherein, the control terminal of each of the control switches electrically connects to the corresponding control signal pad through the corresponding control line, and the input terminal of each of the control switches electrically connects to the corresponding testing signal pad through the corresponding test line, and the output terminal of each of the control switches electrically connects to the signal line of the corresponding panel unit; wherein, one of the test lines respectively connects to at least two of the panel units through at least two of the corresponding control switches;

assembling the first and second substrates and forming a liquid crystal layer between the first and second substrates to form an combined substrate having multiple panel units;

applying a selected electrical signal sequentially at every control signal pad, and electrically and sequentially turning on the control switches corresponding to the panel units, and keeping turning off the other control switches, and when electrically turning on the control switch corresponding to one of the panel units, applying a testing to the corresponding panel unit through the testing signal pad; and cutting the combined substrate to form multiple liquid crystal display panels corresponding, to the multi pie panel units after the completion of the testing.

Wherein, the number of the control signal pad groups, the number of the control line groups, and the number of the panel unit groups are consistent and are corresponding one-by-one.

Wherein, the control terminal of the control switch corresponding to each of the panel unit groups electrically connects to the corresponding one of the control signal pads through the corresponding one of the control lines; the number of the test lines and the number of the testing signal pads are consistent and are corresponding one-by-one, and the input terminals of control switches corresponding to the same signal lines of the panel units all connect to one of the testing signal pads through one of the test lines.

Wherein, each of the control switches is a thin film transistor comprising a gate electrode, a source electrode, and a drain electrode, and the gate electrode electrically connects to the corresponding control signal pad through the corresponding control line, and the source electrode electrically connects to the corresponding testing signal pad through the corresponding, test line, and the drain electrode electrically connects to the corresponding signal line.

The beneficial effects of the present invention are: The inventors of the present application proposed earlier to connect the same test lines or the PSVA lines of the different panel units 21 in parallel to a same circuit line. Each of the same circuit lines connects to one pad. The simplified detection circuit makes each of the pads connect to the N×m test lines or PSVA lines such that the capacitive load of each of the pad is increased. Therefore, the external power supply must have sufficient current supply capacity to avoid the problem of insufficient driving current. Furthermore, in the process of the testing, the N panel units 21 are simultaneously applying, the testing so that when one of the N panel units 21 has a short circuit situation, it is unable to distinguish the panel unit having the short circuit situation. The inventors of present application base on the above situation. In the present invention, the testing pad collection and the switch collection are disposed in the detection circuit so that the signal line of each of the panel units connects to the corresponding testing signal pad of the testing, pad collection respectively through the input terminal and the output terminal of the control switch of the switch collection, and the control terminal of the control switch electrically connects to the control signal pad. It can selectively apply a distinguishable testing to one or a plurality of the panel units, simplifying the detection circuit, reducing the load of the detection circuit at the same time. However, it can also clearly distinguish the panel unit having short circuit.

DETAILED DESCRIPTION OF THE PREFERRED EMBODIMENT

A detection circuit in the assembly process of an LCD panel of the present invention can simplify the detection circuit, and reduce the load of the detection circuit, and also can clearly distinguish the panel unit having short circuit.

The following combines drawings and embodiments for detail description of the present invention.

Figure 3:
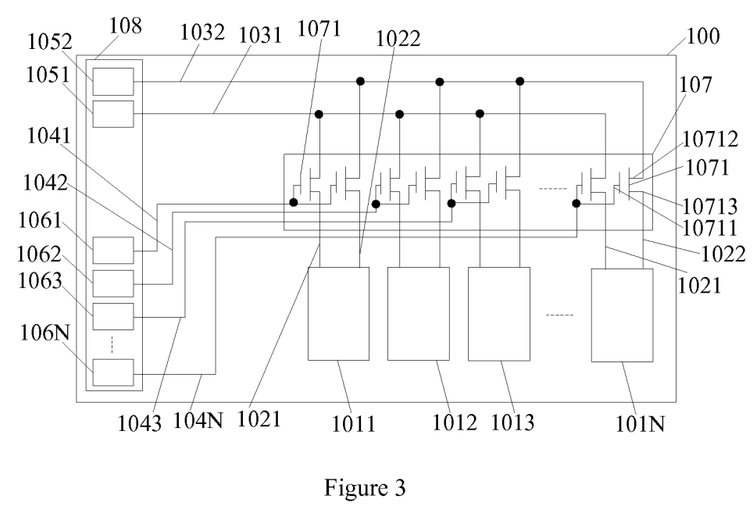
FIG. 3 is a schematic layout of the detection circuit of an embodiment in the assembly process of the LCD panel of the present invention.

With reference to FIG. 3, in one embodiment of the detection circuit of the assembly process of the present invention, the detection circuit is used to apply a testing to the combined substrate 100 having multiple panel units. The testing includes an array testing or a PSVA testing for the multiple panel units.

Specifically, the combined substrate 100 including:

N (N is greater than or equal to 2) panel units, respectively, a panel unit 1011 to a panel unit 101N. Wherein, a panel unit 101k (k less than or equal to N for representing the k-th panel unit of the N panel units) comprises at least one signal line. Using two signal lines for example, the panel unit 101k includes a first signal line 1021 and a second signal line 1022.

Correspondingly, the detection circuit includes two test lines disposed on the combined substrate 100, respectively, a first test line 1031 and a second test line 1032; Multiple control lines are disposed on the combined substrate 100, respectively, for the control line 1041 to control line 104N.

A testing pad collection 108 is disposed on the combined substrate 100, and the testing pad collection 108 includes multiple control signal pads and two testing signal pads. The control signal pads are 1061-106N respectively. The two testing signal pads are respectively a first testing signal pad 1051 and a second testing signal pad 1052.

A switch collection 107 is disposed on the combined substrate 100. The switch collection 107 comprises multiple control switches 1071, and each of the control switches 1071 comprises a control terminal 10711, an input terminal 10712, and an output terminal 10713.

Wherein, each of the control terminals 10711 of the control switches 1071 electrically connects to the corresponding control signal pad through the corresponding control line, and each of the input terminals 10712 electrically connects to a corresponding testing signal pad through the corresponding, test line, and each of the output terminal 10713 electrically connects to the signal line of the corresponding panel unit. The first test line 1031 connects to N panel units respectively through the N control switches 1071, and the second test line 1032 connects to N panel units respectively through the other N control switches 1071.

Specifically, the first test line 1031 electrically connects to the first, testing signal pad 1051, and the second test line 1032 electrically connects to the second testing signal pad 1052. The control lines 1041-104N electrically and correspondingly connects to the control signal pads 1061-106N. The first signal lines 1021 of the panel units 1011-101N electrically connect to the first test line 1031 respectively through the control switches 1071 for inputting testing signals to the panel units 1011-101N through the first testing signal pad 1051.

The second signal lines 1022 of the panel units 1011-101N respectively connect to the corresponding second test line 1032 through the other control switches 1071 for inputting testing signals to the panel units 1011-101N through the second testing signal pad 1052.

Furthermore, using the panel unit 101k for example, the first signal fine 1021 and the second signal line 1022 of the panel unit 101k respectively and electrically connect to the two output terminals 10713 of the two control switches 1071. The two input terminals 10712 of the two control switches 1071 respectively and electrically connect to the first test line 1031 and the second test line 1032 for inputting the testing signals to the panel unit 101k respectively through the first testing signal pad 1051 and the second testing signal pad 1052. And the two control terminals 10711 or the two control switches 1071 corresponding to the panel unit 101k electrically connect to the control signal the pad 106k (k-th control signal pad) through the corresponding control line 104k (k-th control signal line) for controlling the two control switches 1071 corresponding to the panel unit 101k to turn on or turn off through the control signal pad 106k.

From another point of view, the N panel units 1011-101N are divided into N panel unit groups, each of the panel unit groups includes one panel unit, that is, the panel unit 101k. The panel unit 101k includes two signal line groups, one of the signal line groups includes the first signal line 1021, and the other of the signal line groups includes the second signal line 1022. Therefore, the multiple panel units include multiple signal line groups. The detection circuit comprises: two test line groups, wherein, one of the test line groups includes the first test line 1031 and the other of the test line groups includes the second test line 1032; N control line groups, wherein, each of the control line groups includes a control line, that is, the control line 104k; N control signals pad groups, wherein, each of the control signal pad groups comprises a control signal pad, that is, the control signal pad 106K; two testing, signal pad groups, wherein, one of the testing signal pad groups comprises the first testing signal pad 1051, and the other of the testing signal pad groups includes the second testing signal pad 1052; multiple control switch groups, each of the control switch groups comprises a control switch 1071.

Wherein, the number of the groups of the N panel units 1011-101N, the number of the groups of the N control signal pads 1061-106N, and the number of the groups of N control lines 1041-104N are the corresponding. One group of the panel units corresponds to one group of the control signal pads and one group of the control lines, and the three groups are corresponding one-by-one. The number of the groups of the control signal lines of the N panel units 1011-101N and the number of the groups of the control switches 1071 of the switch collection 107 are corresponding. One group of the signal lines corresponds to one group of the control switches. The two groups are corresponding one-by-one.

Furthermore, the number of the control switches 1071 of the control switch group is consistent with the number of the signal lines of the signal line group of the corresponding panel unit, and they are corresponding one-by-one.

The control terminal of the control switch of each of the panel unit groups electrically connects to one control signal pad through one corresponding control line. It can be understand that the control terminals 10711 of the control switches 1071 corresponding, to the panel unit 101k all connect to the corresponding control signal pad 106k through the control line 104k. The number of the test lines and the number of testing signal pads are consistent and they are corresponding one-by-one. The input terminals 10712 of the control switches 1071 corresponding to the first signal lines 1021 of the panel units 1011-101N electrically connect to the corresponding first testing signal pad 1051 through the corresponding first test line 1031. The input terminals 10712 of the control switches 1071 corresponding to the second signal lines 1031 of the panel units 1011-101N electrically connect to the corresponding second testing signal pad 1052 through the corresponding second test line 1032.

The control switch 1071 of the present embodiment may be a thin film transistor including a gate electrode as the control terminal, a source electrode as the input terminal, and a drain electrode as the output terminal. Correspondingly, the two gate electrodes of the thin film transistors corresponding to the panel unit 101k electrically connect to the corresponding control signal pad 106k respectively through corresponding control line 104k.

The source electrodes electrically connect to the first testing signal pad 1051 and the second testing signal pad 1052 respectively through the corresponding first test line 1031 and second test line 1032. The drain electrodes electrically connect respectively to the corresponding first signal line 1021 and second signal line 1022.

The present embodiment, through the control signal pads 1061-106N, can selectively apply testing to one panel unit of the panel units 1011-101N. Specifically, when applying testing to the panel unit 101k, firstly, inputting the control signal correspondingly to the control signal pad 106k to turn on all of the control switches 1071 corresponding to the panel unit 101k. Then, inputting the testing signal from the first testing signal pad 1051 and the second testing signal pad 1052 to the first signal line 1021 and the second signal line 1022 respectively through the corresponding control switches 1071 such that the testing signal can enter the panel unit 101k. By the above way, the detection circuit of the present embodiment can selectively apply an individual testing for one panel unit so as to avoid the problem of larger load generating from the first test line and second test line, applying the testing to multiple panel units, and to simplify the test lines at the same time, reducing the load of the detection circuit, clearly distinguish the panel unit having short circuit.

Of Course, within the allowable range of the load of the detected circuit, it can also possible apply testing to the multiple panel units simultaneously by the control signal pads 1061-106N the specific testing procedure may refer to the foregoing testing method. According to the requirement of the actual testing, for example, the requirement for the PSVA testing for the panel units 1011-101N. It can simultaneously input control signals to the control signal pads 1061-106N so that the first and the second testing signal pad simultaneously input PSVA testing signal to the panel units 1011-101N.

Besides, the panel unit 101k may include three or more signal lines, each of the signal line required to connect to a control switch and a corresponding test line. The same signal lines of the different panel units connected to the same test line respectively by control switch. The number of the test lines and the number of the testing signal pad are consistent, and the specific circuit layout may refer to the detection circuit of the above embodiment.

Figure 4:
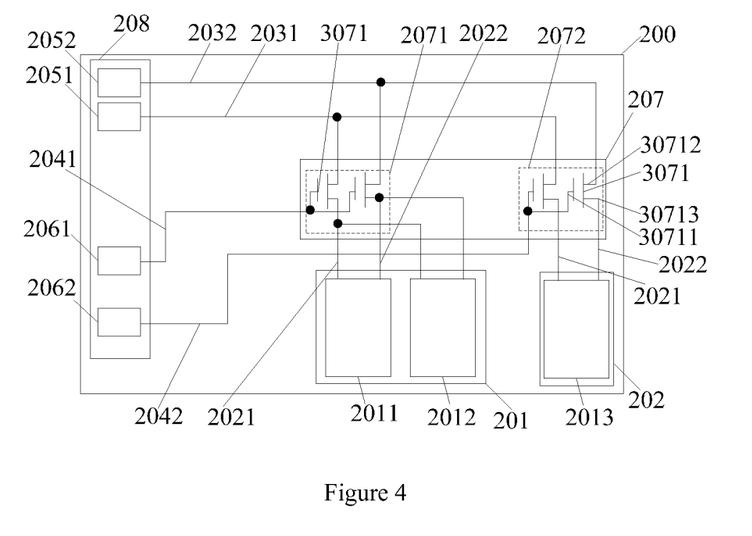
FIG. 4 is a schematic layout of the detection circuit of another embodiment in the assembly process of the LCD panel of the present invention.

In the foregoing embodiments, each of the panel unit groups includes one panel unit. Of course, in another embodiment, it can also make different panel unit group include different number of panel units. With reference to FIG. 4, three panel units 2011-2013 are as an example of this embodiment. The panel units 2011-2013 equally include a first signal line 2021 and a second signal line 2022, that is, two signal lines. The three panel units 2011-2013 are divided into two groups, respectively, a first panel unit group 201 and a second panel unit group 202. Wherein the first panel unit group 201 includes the panel units 2011-2012, and the second panel unit group 202 includes panel unit 2013.

The first panel unit group 201 includes a signal line group, and the signal line group includes the first signal fine 2021 and the second signal line 2022 of panel units 2011-2012. The second panel unit group 202 includes another signal line group, and the signal line group includes the first signal line 2021 and the second signal line 2022 of the panel unit 2013. A switch collection 207 includes two control switch groups. They are respectively a first control switch group 2071 and a second control switch group 2072, and each or the control switch groups comprise two control switches 3071.

Wherein, the first signal lines 2021 of the two panel units 2011-2012 of the first panel unit group 201 electrically connect to the output terminal 30713 of one control switch 3071 of the first control switch group 2071, and the second signal lines 2022 electrically connect to the output terminal 30713 of the other control switch 3071.

The first signal line 2021 of the panel unit 2013 of the second panel unit group 202 electrically connects to the output terminal 30713 of the control switch 3071 oldie second control switch group 2072, and the second signal line 2022 electrically connects to the output terminal 30713 of the other control switch 3071.

The control terminals 30711 of the two control switches 3071 of the first control switch group 2071 electrically connect to the first control signal pad 2061 through the first control line 2041. The control terminals 30711 of the two control switches 3071 or the second control switch group 2072 electrically connect to the second control signal pad 2062 through the second control line 2042.

The input terminals 30711 of the control switches 3071 of the first signal lines 2021 of the panel units 2011-2013 electrically connect to the first testing, signal pad 2051 through the first test line 2031. The input terminals 30712 of the control switches 3071 of the second signal lines 2022 of the panel units 2011-2013 electrically connect to the second testing signal pad 2052 through the second test line 2032.

Through the above way, the present embodiment can respectively apply the testing to the first panel unit group 201 and the second panel unit group 202 through inputting the control signal at the corresponding control signal pads. And within the allowable value of the load of the detection circuit, the two panel units 2011-2012 of the first panel unit group 201 connects to the first and second testing signal pad 2051, 2052 through the same two control switches 3071 such that it can simultaneously apply the testing to the panel unit 2011 and 2012 through the first control switch group 2071. Therefore, the number of the control switches of the detection circuit can be reduced, reducing costs, and detection circuit can be simplified to reduce the load of the detection circuit, and can distinguish the panel unit group having short circuit.

It is worth noting that the multiple panel units of the present embodiment can also be divided, to other types of groups, such as divided, into three groups, and each group of panel units may also include a different number of the panel units. Within the allowed range of load values, the detection circuit can be designed similar to FIG. 3 to be able to apply the testing to a single panel unit, or be designed similar to FIG. 4 to be able to apply the testing to different panel unit groups. The present embodiment is not specifically limited in this.

Figure 5:
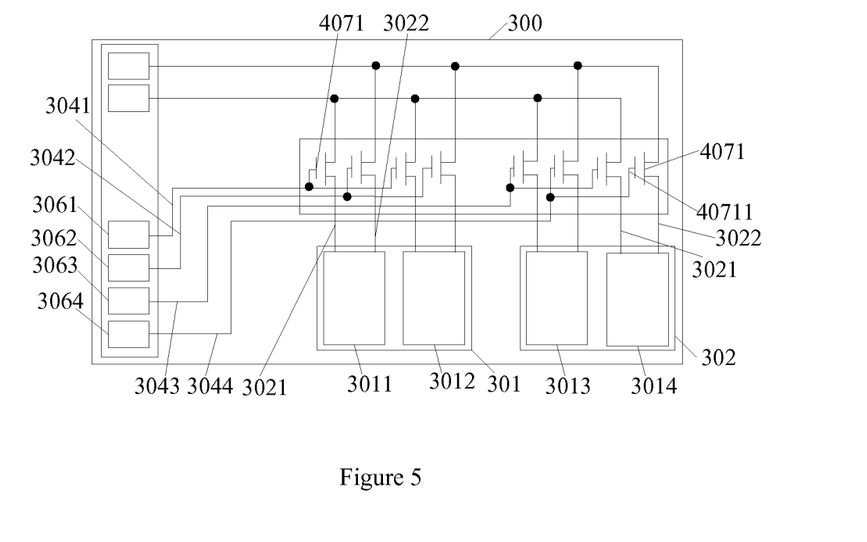
FIG. 5 is a schematic layout of the detection circuit of another embodiment in the assembly process of the LCD panel of the present invention.

With reference to FIG. 5, in another embodiment of the detection circuit of the present invention, it uses four panel units 3011-3014 for example. Within the allowable range of the load of the detection circuit, the panel units are as a group. Wherein, the first panel unit group 301 includes the panel units 3011 and 3012, and the second panel unit group includes the panel units 3013 and 3014. The control terminals 40711 of the control switches 4071 corresponding to first lines 3021 of the two panel units 3011, 3012 of the first panel unit group 301 electrically connect to a control signal pad 3061 through a control line 3041. The control terminals 40711 of the control switches 4071 corresponding to second signal lines 3022 electrically connect to control signal pad 3062 through a control line 3042.

The control terminals 40711 of the control switches 4071 corresponding to the first signal lines 3021 of the two panel units 3013, 3014 of the second panel unit group 302 electrically connected to a control signal pads 3063 through the control line 3043. The control terminals 40711 of the control switches 4071 corresponding to the second signal lines 3022 electrically connect to a control signal pad 3064 through the control line 3044.

In the present embodiment, the control terminals of the control snitches corresponding to the same signal lines the different panel units of the panel unit group electrically connect to the same control signal pad. It can reduce the load of the detection line and identify the panel unit group having short circuit, and also detect the same signal lines of the different panel units having short circuits or faults.

Figure 6:
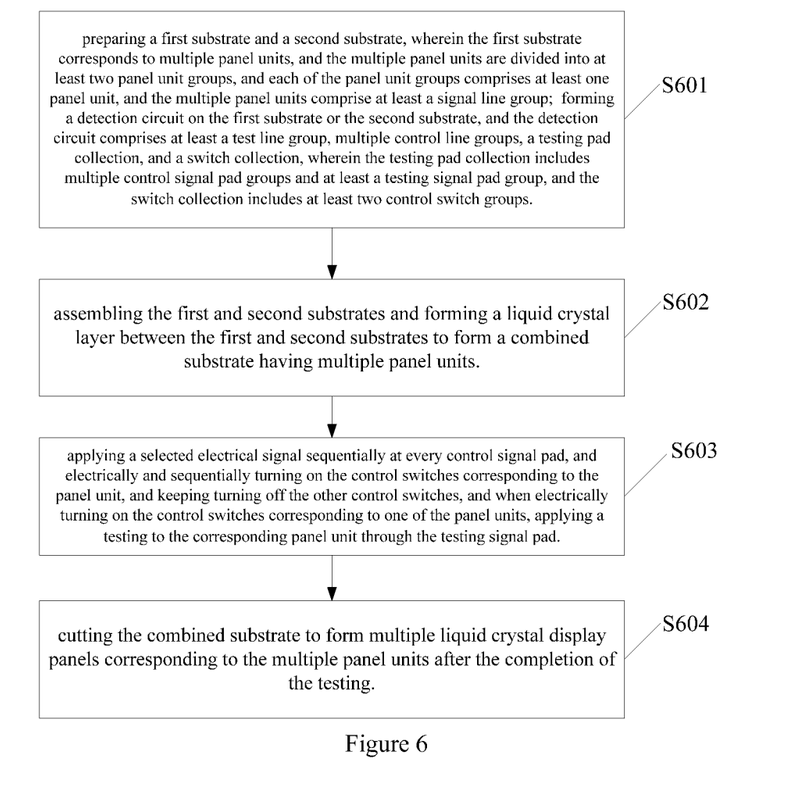
FIG. 6 is a flowchart of the manufacturing method of the LCD panel of an embodiment of the present invention.

With reference to FIG. 6, an embodiment of the manufacturing method of the present invention comprises the steps of:

Step S601: preparing a first substrate and a second substrate, wherein the first substrate corresponds to multiple panel units, and the multiple panel units are divided into at least two panel unit groups, and each of the panel unit groups comprises at least one panel unit, and the multiple panel units comprise at least a signal line group; forming a detection circuit on the first substrate or the second substrate, and the detection circuit comprises at least a test line group, multiple control line groups, a testing pad collection, and a switch collection, wherein the testing pad collection includes multiple control signal pad groups and at least a testing signal pad group, and the switch collection includes at least two control switch groups.

The detection circuit of the present embodiment is the detection circuit described at the above embodiments. The detection circuit shown in FIG. 3 will be described as an example. With reference to FIG. 3, dividing N (N is greater than or equal to 2) panel units 1011-101N to N groups, and each of the groups comprises one panel unit. The detection circuit comprises two test line groups, and one of the test line groups includes the first test line 1031, the other of the test line, groups includes the second test line 1032; N control line groups 1041-104N, and each of control line groups includes a control line; N control signal pad groups 1061-106N, and each of the control signal pad groups comprises a control signal pad; Two testing signal pad groups, and one of the testing signal pad groups comprises the first testing signal pad 1051 and the other of the testing signal pad groups comprises the second testing signal pad 1052; multiple control switch groups, and each of the control switch groups comprises a control switch 1071.

Wherein, each of the control terminals of the control switches 1071 electrically connects to the corresponding control signal pad of the control signal pads 1061-1061N through control lines 1041-104N, and the input terminal electrically connects to the corresponding testing signal pad of the testing signal pads 1051, 1052 through the corresponding the first test line 1021, 1022, and the output terminal electrically connects to the signal line of the corresponding panel unit of the panel units 1011-101N. The first test line 1031 connects to N panel units through the N control switches 1071, and the second test line 1032 connected to N panel units through the other N control switches 1071.

Step S602: assembling the first and second substrates and forming a liquid crystal layer between the first and second substrates to form a combined substrate having multiple panel units.

Step S603: applying a selected electrical signal sequentially at every control signal pad, and electrically and sequentially turning on the control switches corresponding to the panel unit, and keeping turning off the other control switches, and when electrically turning on the control switches corresponding to one of the panel units, testing the corresponding, panel unit through the testing signal pad.

After forming the detection circuit and before forming the liquid crystal display panel, it requires applying the testing to the multiple panel units of the combined substrate to determine if the panel units are broken. Input electrical signals at the control signal pads corresponding to the panel units requiring the testing to turn on the control switches corresponding to the panel units and inputting the testing signals to the corresponding panel units through the testing signal pads to apply the testing to the corresponding panel units.

Step S604: after the completion of the testing, cutting the combined substrate to form liquid crystal display panel corresponding to the multiple panel units.

After the completion of the testing, cutting the combined substrate to separate each of the panel units, and in the subsequent processes, applying sealant curing process to each of the panel units to form the liquid crystal display panels.

The manufacturing method for the liquid crystal display panel of the present embodiment forms the detection circuit on the first substrate or the second substrate. Therefore when forming the combined substrate having multiple panel units, it can apply an individual testing for each of the panel units so as to avoid the larger load problem generating from the first test line and second test line by applying the testing to the multiple panel units, and simplifying the test lines at the time, reducing the load of the detection circuit, clearly distinguish the panel unit having short circuit.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is clamed is:

1. A detection circuit in the assembly process of an LCD panel for applying a testing to multiple panel units of a combined substrate, wherein the multiple panel units are divided into at least two panel unit groups, and each of the panel unit groups comprises at least one of the panel units, and the multiple panel units comprise at least a signal line group, and each of the signal line groups comprises a signal line, and the detection circuit comprises:

at least a test line group disposed on the combined substrate, and each of the test line groups comprises a test line;

multiple control line groups disposed on the combined substrate, and each of the control line groups comprises a control line;

a testing pad collection disposed on the combined substrate, and the testing pad collection comprises multiple control signal pad groups and at least a testing signal pad group, wherein each of the control signal pad groups comprises a control signal pad, and each of the testing signal pad groups comprises a testing signal pad; and a switch collection disposed on the combined substrate, and the switch collection comprises at least two control switch groups, and each of the control switch groups comprises at least a control switch, and the control switch comprises a control terminal, an input terminal, and an output terminal, wherein, the control terminal of each of the control switches electrically connects to the corresponding control signal pad through the corresponding control line, and the input terminal of each of the control switches electrically connects to the corresponding testing signal pad through the corresponding test line, and the output terminal of each of the control switches electrically connects to the signal line of the corresponding panel unit;

wherein, one of the test lines respectively connects to at least two of the panel units through at least two of the corresponding control switches; the number of the control signal pad groups, the number of the control line groups, and the number of the panel unit groups are consistent and are corresponding one-by-one; each of the control switches is a thin film transistor comprising a gate electrode, a source electrode, and a drain electrode, and the gate electrode electrically connects to the corresponding control signal pad through the corresponding control line, and the source electrode electrically connects to the corresponding testing signal pad through the corresponding test line, and the drain electrode electrically connects to the corresponding signal line.

2. The detection circuit according to claim 1, wherein, the control terminal of the control switch corresponding to each of the panel unit groups electrically connects to the corresponding one of the control signal pads through the corresponding one of the control lines; the number of the test lines and the number of the testing signal pads are consistent and are corresponding one-by-one, and the input terminals of the control switches corresponding to the same signal lines of the panel units all electrically connect to one of the testing signal pads through one of the test lines.

3. A detection circuit in the assembly process of an LCD panel for applying a testing to multiple panel units of a combined substrate, wherein the multiple panel units are divided into at least two panel unit groups, and each of the panel unit groups comprises at least one of the panel units, and the multiple panel units comprise at least a signal line group, and each of the signal line groups comprises a signal line, and the detection circuit comprises:

at least a test line group disposed on the combined substrate, and each of the test line groups comprises a test line;

multiple control line groups disposed on the combined substrate, and each of the control line groups comprises a control line;

a testing pad collection disposed on the combined substrate, and the testing pad collection comprises multiple control signal pad groups and at least a testing signal pad group, wherein each of the control signal pad groups comprises a control signal pad, and each of the testing signal pad groups comprises a testing signal pad; and a switch collection disposed on the combined substrate, and the switch collection comprises at least two control switch groups, and each of the control switch groups comprises at least a control switch, and the control switch comprises a control terminal, an input terminal, and an output terminal, wherein, the control terminal of each of the control switches electrically connects to the corresponding control signal pad through the corresponding control line, and the input terminal of each of the control switches electrically connects to the corresponding testing signal pad through the corresponding test line, and the output terminal of each of the control switches electrically connects to the signal line of the corresponding panel unit; wherein, one of the test lines respectively connects to at least two of the panel units through at least two of the corresponding control switches.

4. The detection circuit according to claim 3, wherein, the number of the control signal pad groups, the number of the control line groups, and the number of the panel unit groups are consistent and are corresponding one-by-one.

5. The detection circuit according to claim 4, wherein, the control terminal of the control switch corresponding to each of the panel unit groups electrically connects to the corresponding one of the control signal pads through the corresponding one of the control lines; the number of the test lines and the number of the testing signal pads are consistent and are corresponding one-by-one, and the input terminals of control switches corresponding to the same signal lines of the panel units all connect to one of the testing signal pads through one of the test lines.

6. The detection circuit according to claim 3, wherein, each of the control switches is a thin film transistor comprising a gate electrode, a source electrode, and a drain electrode, and the gate electrode electrically connects to the corresponding control signal pad through the corresponding control line, and the source electrode electrically connects to the corresponding testing signal pad through the corresponding test line, and the drain electrode electrically connects to the corresponding signal line.

7. A manufacturing method for an LCD panel comprising:

preparing a first substrate and a second substrate, wherein the first substrate corresponds to multiple panel units, and the multiple panel units are divided into at least two panel unit groups, and each of the panel unit groups comprises at least one of the panel units, and the multiple panel units comprise at least a signal line group, and each of the signal line groups comprises a signal line, and forming a detection circuit on the first substrate or the second substrate, and the detection circuit comprises:

at least a test line group, and each of the test line groups comprises a test line;

multiple control line groups, and each of the control line groups comprises a control line;

a testing pad collection comprising multiple control signal pad groups and at least a testing signal pad group, wherein each of the control signal pad groups comprises a control signal pad, and each of the testing signal pad groups comprises a testing signal pad; and a switch collection comprising at least two control switch groups, and each of control switch groups comprises at least a control switch, and the control switch comprises a control terminal, an input terminal, and an output terminal, wherein, the control terminal of each of the control switches electrically connects to the corresponding control signal pad through the corresponding control line, and the input terminal of each of the control switches electrically connects to the corresponding testing signal pad through the corresponding test line, and the output terminal of each of the control switches electrically connects to the signal line of the corresponding panel unit; wherein, one of the test lines respectively connects to at least two of the panel units through at least two of the corresponding control switches;

assembling, the first and second substrates and forming a liquid crystal layer between the first and second substrates to form an combined substrate having multiple panel units;

applying a selected electrical signal sequentially at every control signal pad, and electrically and sequentially turning on the control switches corresponding to the panel units, and keeping turning off the other control switches, and when electrically turning on the control switch corresponding to one of the panel units, applying a testing to the corresponding panel unit through the testing signal pad; and cutting the combined substrate to form multiple liquid crystal display panels corresponding to the multiple panel units after the completion of the testing.

8. The manufacturing method according to claim 7, wherein, the number of the control signal pad groups, the number of the control line groups, and the number of the panel unit groups are consistent and are corresponding one-by-one.

9. The manufacturing method according to claim 7, wherein, the control terminal of the control switch corresponding to each of the panel unit groups electrically connects to the corresponding one of the control signal pads through the corresponding one of the control lines; the number of the test lines and the number of the testing signal pads are consistent and are corresponding one-by-one, and the input terminals of control switches corresponding to the same signal lines of the panel units all connect to one of the testing signal pads through one of the test lines.

10. The manufacturing method according to claim 7, wherein, each of the control switches is a thin film transistor comprising a gate electrode, a source electrode, and a drain electrode, and the gate electrode electrically connects to the corresponding control signal pad through the corresponding control line, and the source electrode electrically connects to the corresponding testing signal pad through the corresponding test line, and the drain electrode electrically connects to the corresponding signal line.

* * * * *